US008817049B2

(12) United States Patent
Ofek et al.

(10) Patent No.: US 8,817,049 B2
(45) Date of Patent: Aug. 26, 2014

(54) AUTOMATED FITTING OF INTERIOR MAPS TO GENERAL MAPS

(75) Inventors: Eyal Ofek, Redmond, WA (US); Ran Gal, Rishon Lezion (IL)

(73) Assignee: Microsoft Corporation, Redmond, WA (US)

( * ) Notice: Subject to any disclaimer, the term of this patent is extended or adjusted under 35 U.S.C. 154(b) by 514 days.

(21) Appl. No.: 13/097,956

(22) Filed: Apr. 29, 2011

(65) Prior Publication Data
US 2012/0274642 A1 Nov. 1, 2012

(51) Int. Cl.
*G09G 5/00* (2006.01)
(52) U.S. Cl.
USPC .......................................... 345/649
(58) Field of Classification Search
None
See application file for complete search history.

(56) References Cited

U.S. PATENT DOCUMENTS

| | | | |
|---|---|---|---|
| 5,761,328 A | 6/1998 | Solberg et al. | |
| 6,735,348 B2 | 5/2004 | Dial et al. | |
| 6,757,445 B1 | 6/2004 | Knopp | |
| 7,515,153 B2 * | 4/2009 | Jin et al. | 345/440 |
| 7,558,678 B2 * | 7/2009 | Jones | 702/14 |
| 8,368,695 B2 * | 2/2013 | Howell et al. | 345/427 |
| 8,427,510 B1 * | 4/2013 | Towfiq et al. | 345/654 |
| 8,483,425 B2 * | 7/2013 | Guo et al. | 382/100 |
| 2002/0029226 A1 | 3/2002 | Li et al. | |
| 2008/0033935 A1 | 2/2008 | Frank | |
| 2008/0059889 A1 | 3/2008 | Parker et al. | |
| 2009/0027418 A1 * | 1/2009 | Maru et al. | 345/629 |
| 2012/0166960 A1 * | 6/2012 | Salles | 715/738 |

OTHER PUBLICATIONS

Arkin, Esther M., et al. "An efficiently computable metric for comparing polygonal shapes." Proceedings of the first annual ACM-SIAM symposium on Discrete algorithms. Society for Industrial and Applied Mathematics, 1990.*

Pesti, et al., "Low-Cost Orthographic Imagery", Retrieved at << research.microsoft.com/pubs/75312/pesti-gis-08.pdf>>, International Symposium on Advances in Geographic Information Systems, Nov. 5-7, 2008, pp. 8.

Elson, et al., "MapCruncher: Integrating the World's Geographic Information", Retrieved at << http://citeseerx.ist.psu.edu/viewdoc/download?doi=10.1.1.128.2991&rep=rep1&type=pdf >>, ACM SIGOPS Operating Systems Review—Systems work at Microsoft Research, vol. 41, No. 2, Apr. 2007, pp. 10.

Tanaka, et al., "Development of a Map Vectorization Method Involving a Shape Reforming Process", Retrieved at << http://ieeexplore.ieee.org/stamp/stamp.jsp?tp=&arnumber=395646 >>, Proceedings of the Second International Conference on Document Analysis and Recognition, Oct. 20-22, 1993, pp. 680-683.

* cited by examiner

*Primary Examiner* — Hau Nguyen
*Assistant Examiner* — Ryan M Gray
(74) *Attorney, Agent, or Firm* — Steven Spellman; Jim Ross; Micky Minhas

(57) ABSTRACT

Amalgamated maps, comprising interior maps overlaid on venues indicated in general maps can be automatically generated. Initially, interior maps can be obtained through targeted network searches, whose search results can be filtered to retain those that are most likely useable interior maps. A bounding polygon is generated for both interior map and venue exterior from general map. Subsequently, directional histograms representing orientations of lines in bounding polygons are generated and compared to automatically identify a rotation to align the interior map with the venue exterior from the general map. Anchor points are identified to locally deform the interior map, preserving internal structures, to better align with the venue exterior. Once aligned, the interior map can be combined with the general map, forming an amalgamated map. Updated geocoding can be performed based on locations of establishments in the venue as indicated by the interior map.

20 Claims, 9 Drawing Sheets

AUTOMATED FITTING OF INTERIOR MAPS TO GENERAL MAPS

BACKGROUND

The confluence of a number of technological advances has enabled computer-aided navigation to become ubiquitous. Global positioning technology, such as the Global Positioning System (GPS) has enabled the relatively precise determination of the location of any computing device comprising, or communicationally coupled with, a GPS sensor. Additionally, the capacity of computer-readable storage media to store information has increased sufficiently to enable a geographically diverse set of maps to be stored on the computer-readable storage media of a computing device that is sufficiently portable that a user can carry it with them wherever they may desire computer-aided navigation. Consequently, a modern traveler can obtain detailed directions to guide them to their destination from a myriad of computing devices, such as vehicle navigation systems, portable, or personal, dedicated navigation computing devices, or more general purpose, but still portable, computing devices, such as cellular telephones, tablet computing devices and laptop computing devices.

Typically, the computing devices that provide navigation and directions to a user do so on the basis of maps that are either stored locally with the computing device, or are obtained by the computing device through network communications, including wireless and cellular network communications. In the former case, updates to the locally stored maps can be required to ensure that such maps are current and comprise the most accurate information at the time of the update. Such updates can occur through either wired, or wireless network communications. Conversely, in the latter case, the centrally stored maps can be continuously updated, and the computing device providing navigation can always have access to up-to-date information, so long as it can communicate with such a central mapping source.

The map data utilized to provide such navigation and directions is based on satellite imagery and known exterior mapping techniques. As such, the map data comprises information such as streets, addresses, geographic boundaries, lakes, rivers, and other geographic attributes, and other like data. Typically, the map data also comprises photographic imagery such as satellite photographs, real-time traffic cameras, "street-level view" images, and other like photographic imagery. Utilizing the photographic imagery, the map data can further comprise general information, such as size, exterior shape, and location, of venues such as malls, airport terminals, arenas, skyscrapers, or other like venues.

In many cases, the destination of the user is a particular establishment inside a larger venue. Unfortunately, because the map data utilized to provide navigation and directions treats the venue as a singular entity, the navigation and directions provided to a user can be suboptimal. For example, all of the stores within the mall may share the same address, or may otherwise be geocoded to the location of the mall. In such a case, the navigation and directions provided to a user can guide the user to the mall, but cannot identify, for example, which side of the mall the user is to park on. Depending on the size and configuration of the venue, as well as its surrounding accessways, the lack of interior map data for the venue can result in the user being guided along slower, or less efficient routes, and can result in the user being directed to a destination that is a substantial distance, typically covered by foot, from the establishment that the user is intending to visit.

SUMMARY

In one embodiment, an amalgamated map can be generated by integrating interior maps of venues with the existing exterior structure, or outline, of the venue that is already present in the general map data, or in photographic imagery associated therewith.

In another embodiment, existing map data representing an interior map of a venue can be obtained via a focused search that can be performed in an automated manner. The returned results can then be filtered to obtain one or more interior maps that can be utilized to extract information regarding the interior of a venue.

In a further embodiment, an obtained interior map can be aligned with its corresponding venue in a general map by first obtaining bounding polygons of both the interior map and the corresponding venue in the general map. Subsequently, directional histograms describing the orientation of the lines of the bounding polygons can be compared to identify a proper rotation to be applied to the obtained interior map to align it with its corresponding venue in the general map. Additional deformation can be applied, either through user input, or through automated processes, to align the interior map with its corresponding venue in the general map, while preserving the interior structure of the interior map.

In a still further embodiment, once an interior map has been aligned with its corresponding venue in a general map, to produce an amalgamated map, the geocoding of individual establishments identified on the interior map, and that are part of the venue, can be updated such that their location is more accurately represented within the amalgamated map, thereby resulting in more accurate, and optimal, navigation and directions being presented to users seeking to travel to such establishments.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
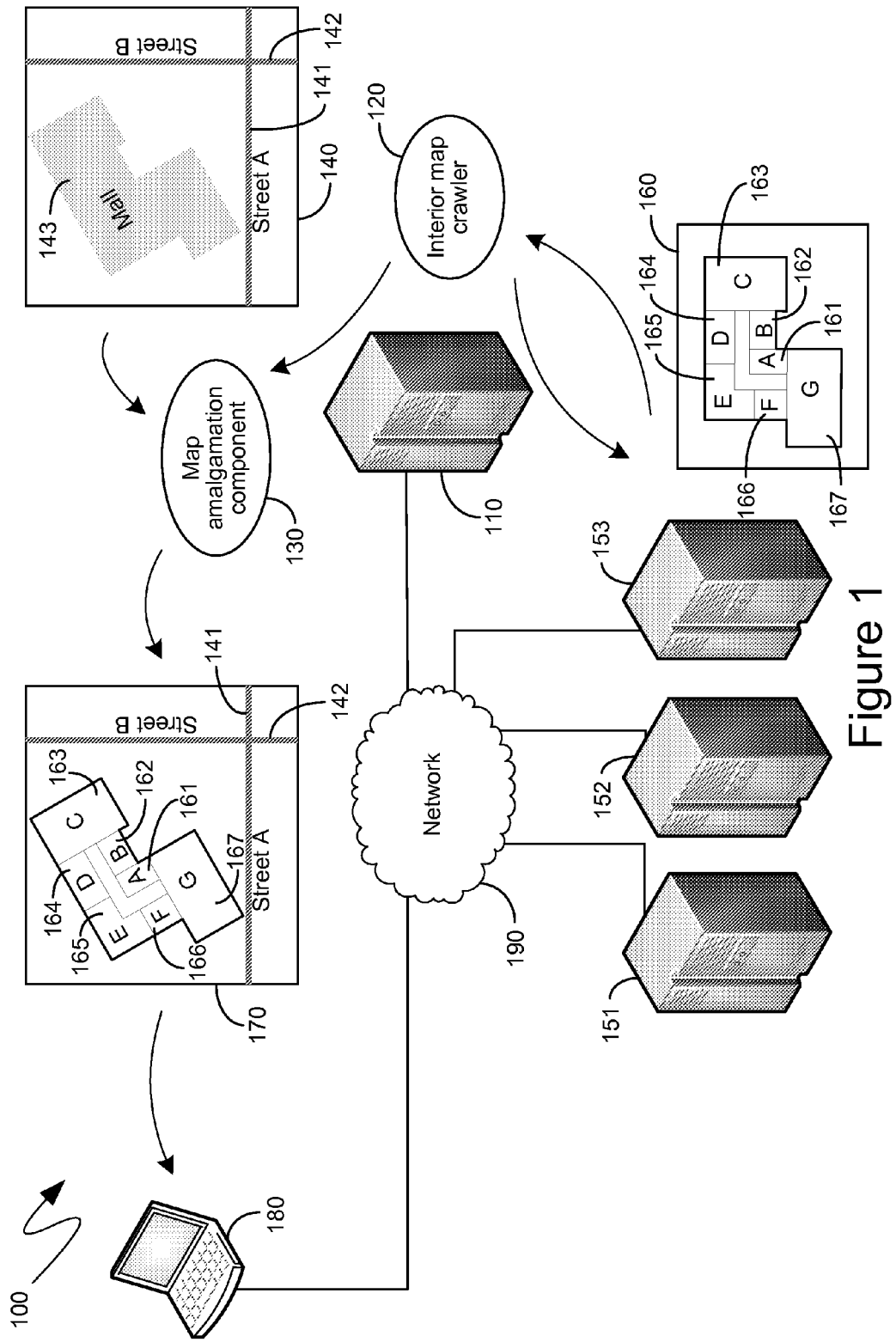
FIG. 1 is a block diagram of an exemplary system for generating amalgamated map data.

The following description relates to mechanisms for automatically generating amalgamated map data comprising general map data and interior map data for at least some venues indicated in the general map data. Initially, interior map data for a venue indicated in the general map data can be obtained through targeted network searches. Subsequently, the search results can be filtered to obtain one or more interior maps that can be utilized to generate the amalgamated map data. A bounding polygon can be generated for both an interior map and for the exterior of the venue as indicated in the general map. Subsequently, directional histograms that describe the orientation of the lines in the bounding polygons can be generated and can be compared to automatically identify a rotation to be applied to the interior map to align it with the exterior of the venue as indicated in the general map. A user interface can be presented to enable a user to identify anchor points that can be utilized to further deform the interior map to match the exterior of the venue as indicated in the general map. Alternatively, mechanisms such as a Turn Angle Sum (TAS) approach can be utilized to automatically identify and position such anchor points. With the anchor points established, the interior map can be deformed, while maintaining the internal structure of the interior map including, for example, the parallelism of lines, the relative sizing of particular entities within the interior map, the retention of 90° angles, and other like structural aspects. Once the interior map is aligned with the venue as indicated in the general map, the data from the interior map can be added to the venue in the general map, thereby generating the amalgamated map data. The amalgamated map data can then be geocoded to provide updated location information for the establishments inside the venue whose more precise location can now be identified.

For purposes of illustration, the techniques described herein make reference to a mall, but such references are strictly exemplary and are not intended to limit the mechanisms described to the processing of mall maps. Indeed, the techniques described are equally applicable to any venue of which an interior map can be found, including airports, arenas, skyscrapers or other large buildings, and other similar venues.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, a system 100 is shown, comprising computing devices 110, 151, 152, 153 and 180, all of which can be communicationally coupled, such as via a network 190. In one embodiment, a computing device, such as the server computing device 110, can have access to general map data 140 that can comprise geographic information including, for example, an exterior structure of the venue 143, as well as surrounding thoroughfares, such as the streets 141 and 142. As utilized herein, the term "general map" and the term "general map data" mean geographic maps and data that comprise thoroughfares, as well as other geographic data, such as lakes, rivers, mountains and the like. The computing device 110 can also comprise an interior map crawler 120 that can obtain, from other computing devices, such as the computing devices 151, 152 and 153, interior maps, such as the interior map 160, comprising an illustration of the position of various establishments, such as the establishments 161, 162, 163, 164, 165, 166 and 167 within the venue 143. As utilized herein, the term "interior map" and the term "interior map data" mean illustrated maps showing the relative positions of establishments and other like entities inside a venue. The computing device 110 can further comprise a map amalgamation component 130 that can automatically generate an amalgamated map 170 that can comprise both the information from the general map 140, such as the thoroughfares 141 and 142, and the information from the interior map 160, such as the establishments 161, 162, 163, 164, 165, 166 and 167. Such an amalgamated map 170 can then be made available to computing devices, such as the computing device 180, that can utilize such information to guide a user in an optimal manner to those establishments.

In one embodiment, the interior map crawler 120 can search the computing devices communicationally coupled to the network 190, such as the computing devices 151, 152 and 153, for interior maps, such as the interior map 160, that correspond to a particular venue in the general map, such as the venue 143 in the general map 140. For example, the interior map crawler 120 can search the network 190 for images associated with the name of the venue 143 together with keywords such as, for example, the word "map". The resulting images can then be filtered by the interior map crawler 120 to select one or more images that can most effectively be utilized by the map amalgamation component 130.

Upon receiving one or more images, representing interior map data, such as the interior map 160, the map amalgamation component 130 can attempt to automatically orient and align such an interior map 160 with the existing general map 140. In one embodiment, the map amalgamation component 130 can first vectorize the interior map 160 to enable more accurate processing of the interior map 160. The map amalgamation component 130 can also generate bounding polygons for both the venue as illustrated in the interior map 160 and as illustrated in the general map 140, or in photographs associated with the general map 140, such as satellite images. The generated bounding polygons can be utilized to determine an appropriate rotation to be applied to the interior map 160, as well as a deformation that can be applied to the interior map 160, to enable the interior map's representation of the venue to align, as accurately as possible, with the venue 143 as shown in the general map 140. Once such an alignment is performed, the map amalgamation component 130 can geocode the resulting amalgamated map 170 so as to provide for more accurate location and position information for the establishments within the venue 143, such as the establishments 161, 162, 163, 164, 165, 166 and 167.

In one embodiment, although the amalgamated map 170 can comprise both the data from the general map 140 and from the interior map 160, both such data need not always be presented together. For example, a user of the computing device 180 can be presented with only data from the general map 140 until the user "zooms in" such that the venue 143 is displayed sufficiently large to accommodate the detail that the amalgamated map obtained from the interior map 160. Conversely, if the user continues to "zoom in", eventually the information from the general map 140 may no longer be able to be displayed, since the venue 143 can comprise most or all of the display available to the user, such as through the computing device 180. In such an example, the user can be presented with data only from the interior map 160. In one embodiment, when presenting data only from the interior map 160, the interior map 160 can be presented in an original form, such as it had prior to the below described processing that can be performed, for example, by the map amalgamation component 130.

Figure 2:
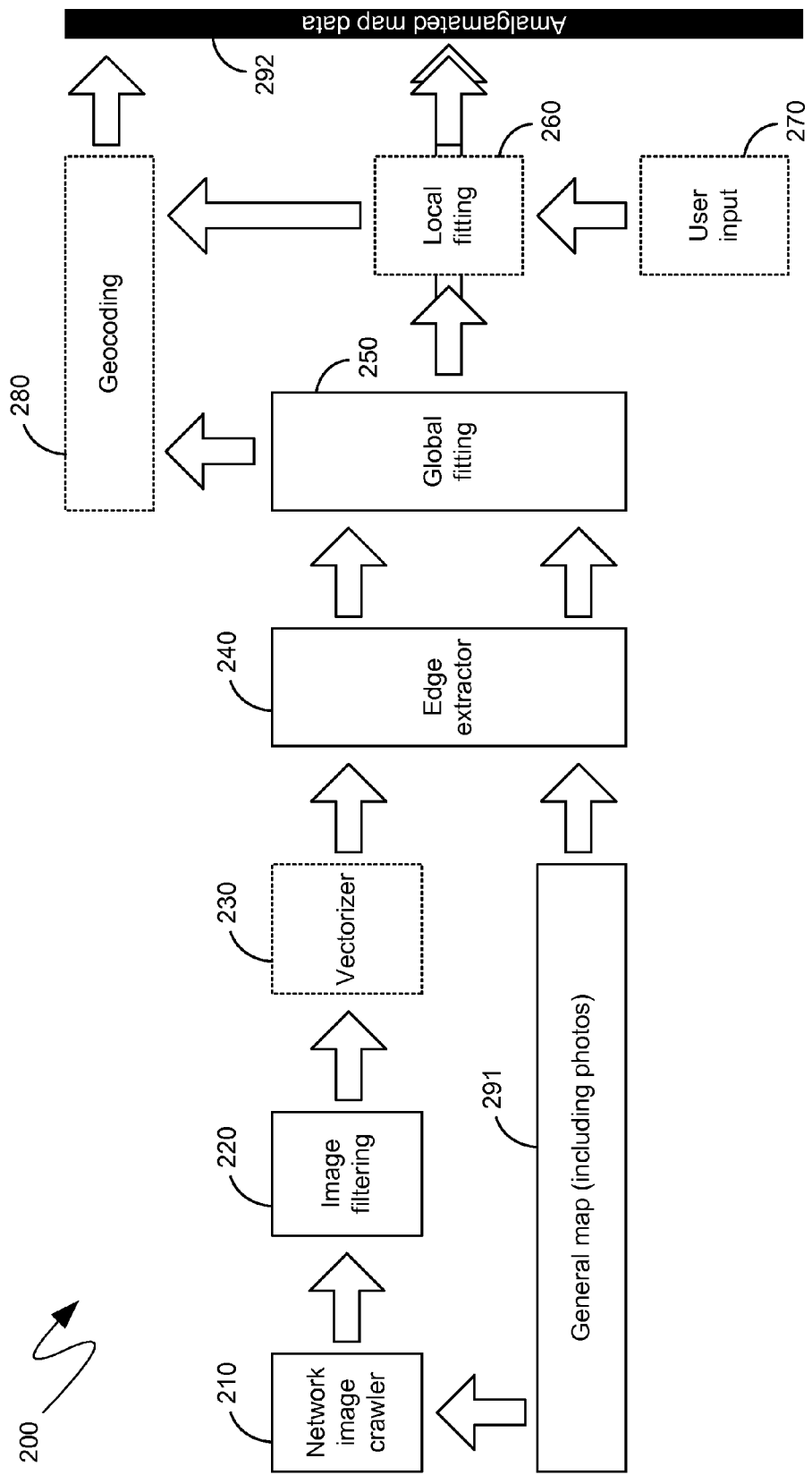
FIG. 2 is a block diagram of an exemplary generation of amalgamated map data.

Turning to FIG. 2, the system 200 shown therein illustrates an exemplary set of components that can comprise the interior map crawler 120 and the map amalgamation component 130, that were shown in FIG. 1. More specifically, as shown in the system 200 of FIG. 2, the interior map crawler 120, that was shown in FIG. 1, can comprise the network image crawler 210 and the image filtering component 220. In one embodiment, the network image crawler 210 can search a network, such as the network 190 shown in FIG. 1, for images that can be interior maps of relevant venues. For example, the network image crawler 210 can search a network for images that are associated with an identification of the venue, such as a name of the venue, and are also associated with an identifier typically associated with interior maps, such as, for example, the term "map", "plan", "directory" and the like. As illustrated in the system 200 of FIG. 2, the network image crawler 210 can obtain the name of the venue, or other like identification of the venue, from the general map 291.

The image filtering component 220 can receive the images obtained by the network image crawler 210 and can filter them to identify those images that can most effectively be utilized to generate the amalgamated map data 292. For example, in one embodiment, the image filtering component 220 can filter out images that are too small, or have too low a resolution, to be useful. Such filtering can remove "thumbnail" images, as well as other low-resolution images. As another example, in one embodiment, the image filtering component 220 can filter out images that have too wide a color spectrum. Typically, interior maps are drawn, or artistically rendered, images where a relatively small color palette is utilized. Consequently, images with a wide color spectrum are more likely to be photographs than useful interior maps.

In one embodiment, the image filtering component 220 can attempt to perform Optical Character Recognition (OCR) on textual aspects of the images obtained by the network image crawler 210. In such an embodiment, the image filtering component 220 can first filter out those images that do not have text, or text that is of sufficient resolution to be able to be OCRed. Subsequently, the image filtering component 220 can OCR the text of the remaining images and can filter out those images whose OCRed text does not comprise entities, or establishments, that are known to be in the venue for which an interior map is being searched for.

If one or more images remain after the filtering performed by the image filtering component 220, they can be passed to the vectorizer 230, where such images can be converted from raster images, as would be typical for the images obtained by the network image crawler 210, into vector-based images that can more easily be manipulated by the subsequent components. As will be described in further detail below, the images representing the interior map need not be vectorized in order to generate the amalgamated map data 292. Consequently, the vectorizer 230 is illustrated, in the system 200 of FIG. 2, with dashed lines to indicate that it is an optional component.

The interior map can then be provided to an edge extractor component 240 that can obtain an outline, or "bounding polygon", of the venue as represented in the interior map. The edge extractor component 240 can, in a similar manner, obtain an outline, or "bounding polygon", of the venue as represented in the general map 291. In one embodiment, the general map 291 can comprise a simplified graphical representation of the exterior of the venue, such as for visual reference purposes. In such an embodiment, such a graphical representation can be provided to the edge extractor 240. In an alternative embodiment, however, the general map 291 may not, itself, comprise such a graphical representation, but it can comprise photographs, such as satellite imagery and the like of the venue, which can be provided to the edge extractor 240.

The bounding polygons of the interior map and the exterior of the venue, as obtained from the general map 291, can be provided, by the edge extractor 240, to a global fitting component 250. The global fitting component 250 can align the interior map with the exterior of the venue, as presented by the general map 291, by transforming the interior map. As will be recognized by those skilled in the art, typically interior maps can be generated with artistic license to present venue information to users in a clear manner and without necessarily the constraints of the precise size and shape of the venue. Thus, for example, interior maps can be distorted in order to be more simple, can be drawn not to scale and can have other artistic liberties taken that may need to be undone to properly align an interior map with the exterior of the venue, as presented by the general map 291. In one embodiment, the global fitting components 250 can utilize the provided bounding polygons to generate directional histograms, for each of the provided bounding polygons, that represent the orientation, and magnitude, of each line in the bounding polygons. The directional histograms can then be compared to identify an angle of rotation that can be one of the transformations that the global fitting component 250 can apply to the interior map to align it with the exterior of the venue, as presented by the general map 291. In one embodiment, as illustrated by the arrows in the system 200 of FIG. 2, the alignment obtained by the global fitting component 250 can then be utilized by that component to combine, with that alignment, information from the interior map with the exterior of the venue, as presented by the general map 291, to generate the amalgamated map data 292.

In another embodiment, the alignment of the interior map with the exterior of the venue, as presented by the general map 291, can be provided to a geocoding component 280 that can update the location associated with one or more of the establishments in the venue based on the more precise location that can be obtained from the interior map when it is aligned with the exterior of the venue, as presented by the general map 291. As in the case of the vectorizer 230, the geocoding component 280 is illustrated with dashed lines in the system 200 of FIG. 2 to indicate that it is an optional component.

In another embodiment, the alignment performed by the global fitting 250 can be further refined by a local fitting component 260, either automatically or with the aid of a user input component 270. The local fitting component 260 can deform the interior map based on anchor points that can identify portions of the interior map that are to align with portions of the exterior of the venue, as presented by the general map 291. In performing the deformation, the local fitting component 260 can seek to preserve the interior structure of the interior map including, for example, preserving the parallelism of lines that were illustrated as parallel in the interior map, preserving the relative sizing of structures in the interior map, and preserving right angles that were illustrated as such in the interior map. The local fitting component 260 can itself identify anchor points from which to perform the deformation, such as by utilizing the known Turn Angle Sum (TAS) method, or the local fitting component 260 can receive user input from a user input component 270 that can present a user interface showing the interior map overlaid over an exterior of the venue, as presented by the general map 291, and, thereby, enabling a user to drag and select appropriate anchor points. As before, both the local fitting component 260 and the user input component 270 are illustrated, in the system 200 of FIG. 2, with dashed lines to indicate that they are optional components.

Figure 3:
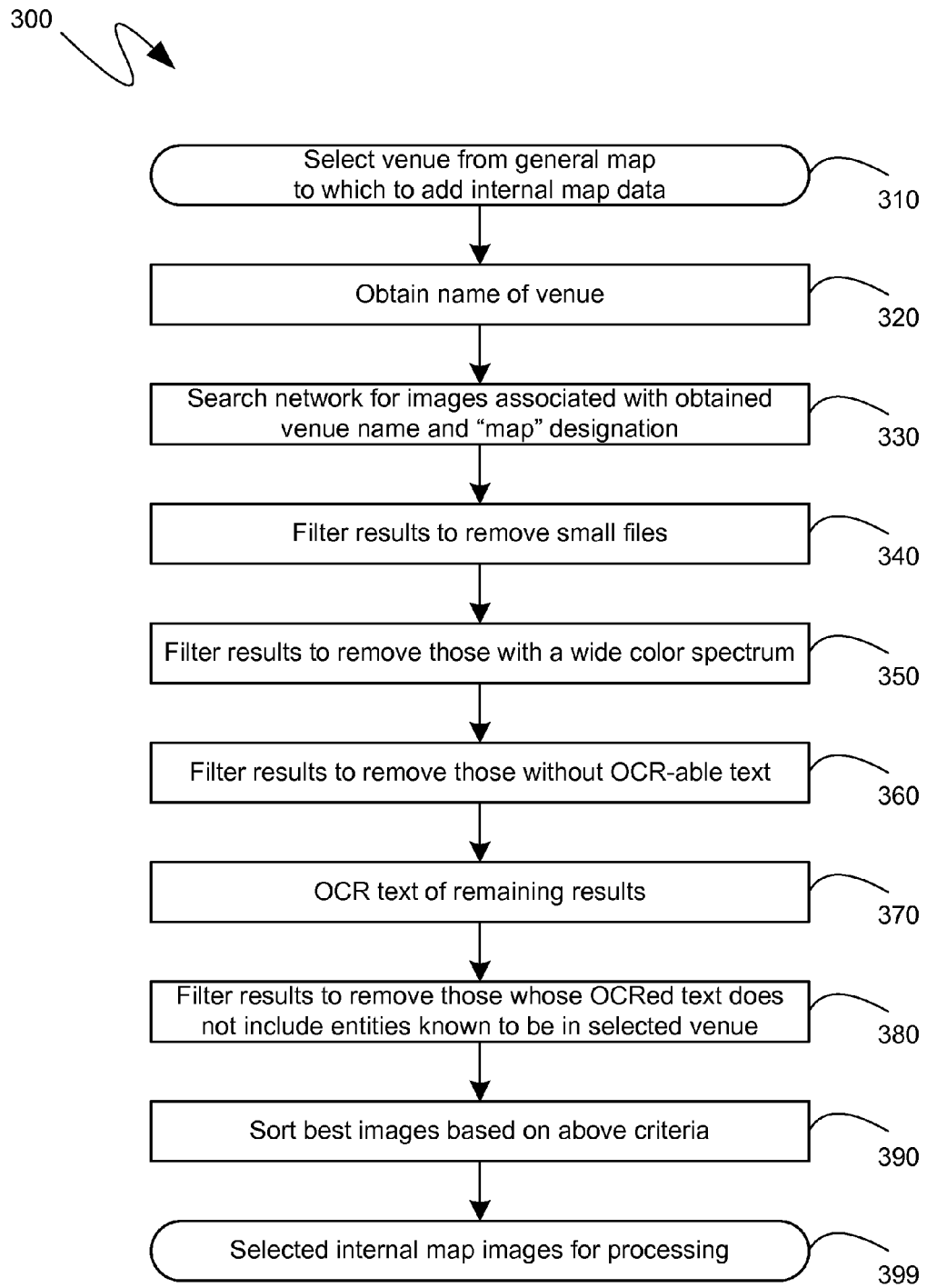
FIG. 3 is a flow diagram of an exemplary obtaining of interior maps.

Turning to FIG. 3, the flow diagram 300 shown therein illustrates an exemplary series of steps that can be performed by the interior map crawler 120 shown in FIG. 1. Initially, as shown by the flow diagram 300 of FIG. 3, a venue from a general map can be selected, at step 310, for which internal map data is to be added. Such a selection can be performed automatically, such as by an iterative process cycling through some or all of the venues identified in a general map, or it can be performed manually, such as by a human user selecting specific venues to which to add internal map data. Subsequently, at step 320, the name of the venue, or other identifier of the venue, can be obtained. As will be recognized by those skilled in the art, the name of or identifier of the venue can, typically, be obtained from the general map data itself. At step 330, a search can be performed, such as of a network, for images associated with the identifier of the venue and an appropriate designation. For example, at step 330, an image search can be performed on the name of the venue and the terms "map", "directory", "plan", or other like terms.

The results received in response to the search of step 330 can then be filtered to identify those results that are most utilizable by subsequent processing. For example, at step 340, the results received in response the search of step 330 can be filtered to remove small files, such as "thumbnails", or other like files having an insufficient resolution to be useful. Similarly, at step 350, a further filtering can be applied to remove those results that comprise a wide color spectrum since, as indicated previously interior maps are typically illustrated and, as such, do not comprise a large color palette. Consequently, the filtering performed at step 350 can remove photographs or other like images that may not be as useful. As another example, at step 360, the results can be further filtered to remove those that do not comprise text, or whose text is too distorted, too small, or of too low resolution to be accurately OCRed. As will be recognized by those skilled in the art, the filtering applied by steps 340, 350 and 360 need not be applied in the specific order illustrated and can, instead, be applied in any order. Typically, however, filtering is applied such that those filters which are most efficiently implemented are performed prior to those filters whose implementation may require more substantial computational effort and resources.

In one embodiment, at step 370, optical character recognition can be performed on the text of the remaining results. Subsequently, at step 380, the text obtained by step 370 can be compared with the names, or other identifiers, of entities and establishments that are known to be in the identified venue and those results whose text does not comprise entities and establishments that are known to be in the identified venue can be filtered out. If, after step 380, there still remain too many images, the remaining images can be sorted in accordance with the above criteria at step 390 and the best images can be selected for further processing at step 399. For example, the sorting, at step 390, can sort the remaining images according to resolution, such that high-resolution images are sorted above lower resolution images. Similarly, the sorting, at step 390, can sort the remaining images according to color spectrum such that images with a smaller color spectrum are sorted above images with a higher color spectrum. The relevant processing can then end at step 399, with the selection of one or more internal map images, based on the sorting performed at step 390, if necessary.

Figure 4:
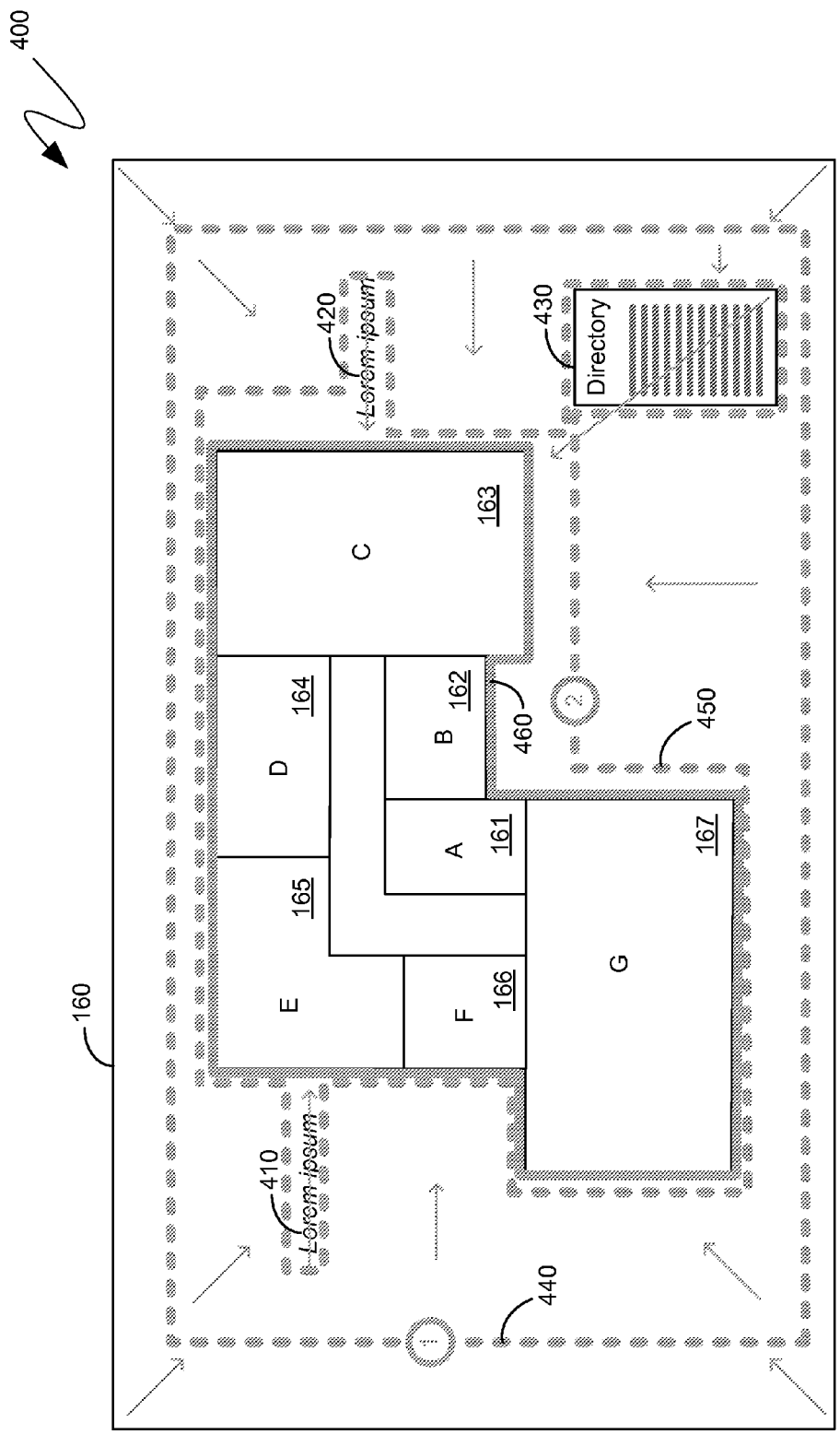
FIG. 4 is a block diagram of an exemplary generation of a bounding polygon.

Turning to FIG. 4, one exemplary mechanism for determining a bounding polygon is illustrated by the system 400 shown in FIG. 4. An interior map image 160 can be processed to determine a bounding polygon by commencing inward, from the edges of the image 160, as illustrated by the arrows in the system 400 of FIG. 4. Thus, as shown, an intermediate bounding polygon 440 can continue to be shrunk inward from the edges until it reaches non-background content. A further intermediate bounding polygon 450 is shown as having progressed further inward from the intermediate bounding polygon 440. As can be seen, the further intermediate bounding polygon 450 encompasses illustrative elements in the interior map image 160 that are not actually part of the interior map. For example, the further intermediate bounding polygon 450 encompasses a directory 430 and text 410 and 420 that are not part of the interior map itself In one embodiment, while proceeding inward from the edges of an image, the determination of the bounding polygon can exclude portions of an image that are disconnected from other portions. Thus, for example, the directory 430 can be excluded, as illustrated by the arrow through it, because it is not connected to the remaining structures in the image 160. The final, determined, bounding polygon 460 can, consequently, have been obtained by excluding the directory 430 and continuing to proceed towards the center of the image until other image elements were reached. In one embodiment, however, a determination can be made as to whether a disconnected structure is, in fact, connected to the venue, such as via a narrow walkway or the like, and, in such cases the determined bounding polygon can include the disconnected structure.

Similarly, in one embodiment, while proceeding inward from the edges of an image, the determination of a bounding polygon can exclude text, such as can be identified by an OCR component. Consequently, as shown in the system 400 of FIG. 4, the text 410 and 420 can be excluded and, as illustrated by the arrows, the final bounding polygon 460 can be determined by continuing to proceed inward through the text 410 and 420 from the further intermediate bounding polygon 450.

Although not specifically illustrated in FIG. 4, analogous processing can be applied to images or illustrations of the exterior of the venue, that is represented by the interior map 160, as those images or illustrations are presented by the general map. As will be recognized by those of skill in the art, the determination of a bounding polygon, or other like outline, can enable the fitting of an interior map to an exterior representation because the outline, or "bounding polygon", of both the interior map and the exterior representation both comprise the same aspect of the venue.

Additionally, for ease of visual presentation and description, the system 400 of FIG. 4 illustrates the derivation of a bounding polygon for a single-story venue. However, equivalent mechanisms can be applied to each story in a multi-story venue. In such a case, the exterior representation of the venue and, more specifically, the roof of the venue may comprise further information that can be utilized to facilitate the fitting of an interior map to an exterior representation. For example, different height roofs can be utilized to distinguish a bounding polygon for one story from the bonding polygon of another story, such as in a multi-story mall where one story does not precisely overlap another. Additionally, there can be features on the roof of a venue, whether single-story or multi-story, which can be utilized as reference points for establishments inside the venue. For example, large elongated skylights can correspond to corridors or other like open spaces within the venue. Similarly, slightly different roof heights, which can be visible features on the roof of a venue, can correspond to establishments that may have different height ceilings.

Figure 5:
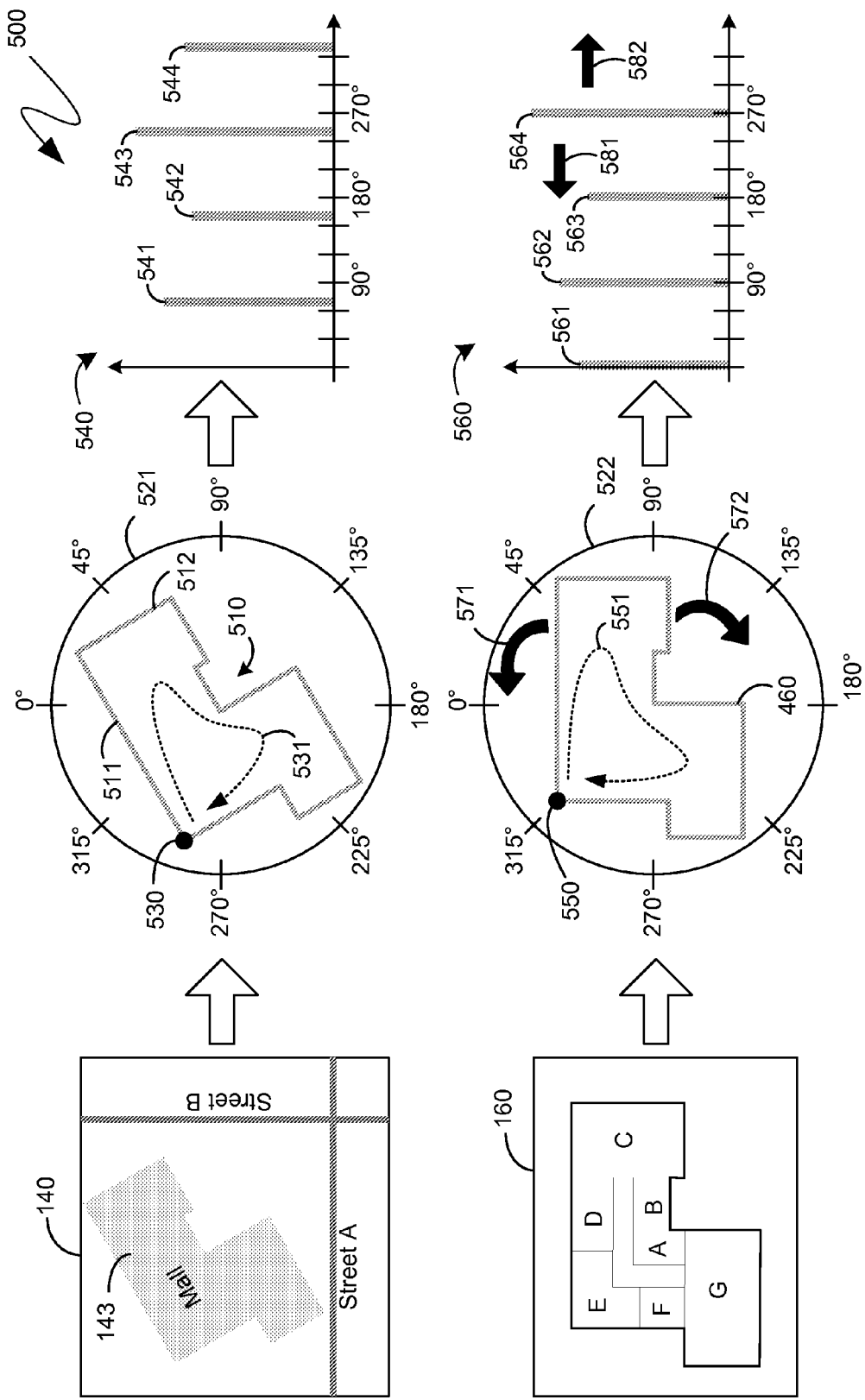
FIG. 5 is a block diagram of an exemplary automated determination of a rotation to be applied to an interior map.

Turning to FIG. 5, the system 500 shown therein illustrates one exemplary mechanism for identifying a rotation to be applied to the interior map 160 to align it with the exterior representation of the venue 143 in the general map 140. In simple cases, where bounding polygons do not have rotational symmetry, a simple calculation of their Eigen vectors can also be used to find the rotation. For purposes of the descriptions below, however, a more generally applicable mechanism is illustrated and described. As shown in the system 500 of FIG. 5, a bounding polygon 510 can be obtained from the exterior representation of the venue 143 in the general map 140, such as in the manner described in detail above. The individual line segments of the bounding polygon 510 can then be considered within the context of their directional orientation. For example, processing can commence with the point 530 and can proceed around the bounding polygon 510 in a clockwise manner, as illustrated by the arrow 531. For each line segment encountered, the magnitude of that line segment and its directional orientation can be represented in a histogram, such as the histogram 540. For example, the line segment 511 is shown as being oriented in approximately a 60° direction. Thus, its magnitude is reflected in the histogram 540 as part of the magnitude 541 shown at the 60° mark of the histogram. Similarly, the line segment 512 is shown as being oriented in approximately a 150° direction and, consequently, its magnitude is reflected in the histogram 540 as part of the magnitude 542 that is shown at the 150° mark.

Because the exemplary venue 143 comprises right angles among the connected line segments of its bounding polygon 510, the resulting histogram 540 shows four different magnitudes 541, 542, 543 and 544 that are spaced approximately 90° apart. In a similar manner, the bounding polygon 460 of the interior map 160, whose derivation was described above and illustrated in FIG. 4, can be processed in a like manner. For example, commencing at the point 550, and proceeding in a clockwise direction, as illustrated by the arrow 551, a histogram 560 can be generated representing the magnitudes of the line segments of the bounding polygon 460. Again, as with the histogram 540, the histogram 560 can comprise magnitudes 561, 562, 563 in 564 that are spaced approximately 90° apart since the bounding polygon 460 on which the histogram 560 is based also comprises line segments at right angles to one another.

As will be recognized by those skilled in the art, rotation of the bounding polygon 460, such as is illustrated by the arrows 571 and 572, can result in the magnitude 561, 562, 563 and 564 of the histogram 560 sliding in either the left or right direction, as illustrated by the arrows 581 and 582. More precisely, were the bounding polygon 460 to be rotated in a counterclockwise direction, as illustrated by the arrow 571, the magnitudes 561, 562, 563 and 564 of the histogram 560 would slide to the left, as illustrated by the arrow 581. Similarly, were the bounding polygon 460 to be rotated clockwise direction, as indicated by the arrow 572, the magnitudes 561, 562, 563 and 564 of the histogram 560 would slide to the right, as indicated by the arrow 582. In one embodiment, the bounding polygon 460 can be rotated until the histogram 560 aligns itself with the histogram 540 of the bounding polygon 510 of the exterior representation of the venue for 143 as obtained from a general map 140.

Figure 6:
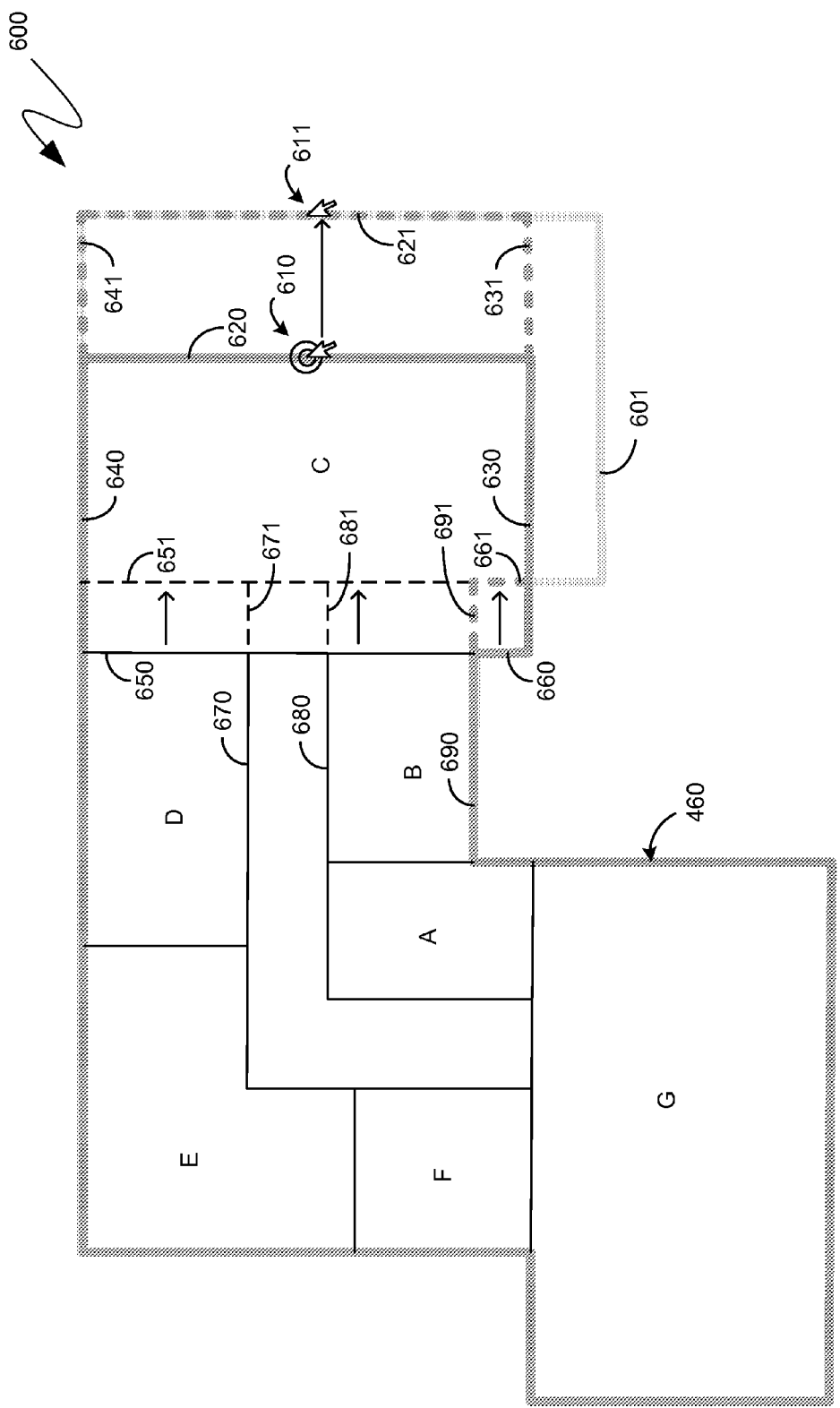
FIG. 6 is a block diagram of an exemplary deformation while retaining internal structures.

However, as will be recognized by those skilled in the art, the illustrators of interior maps often take artistic liberties in representing the interior establishments of a venue. Some of those artistic liberties can be undone through the above described aligning process. Others of those artistic liberties can be undone through stretching and other deformation of the interior map. Turning to FIG. 6, the system 600 shown therein illustrates an exemplary deformation of the bounding polygon 460 of an interior map to match a bounding polygon 601 of an exterior representation of a venue, from a general map.

In one embodiment, the via a user interface, a user can indicate a deformation to be applied to the bounding polygon 460. For example, a user can click with a pointer, as illustrated at location 610, and can select the line segment 620 and drag it to the location 611, thereby moving it to be, the line segment 621. Such an action can be considered the establishment of an anchor point, and the user's actions can be taken to mean that the line segment 620 is to be moved to the location indicated and become the line segment 621, and that that location is to be treated as an absolute as far as other automated deformations that may occur to maintain the internal structure of the interior map.

In an alternative embodiment, automated processes can establish anchor points, rather than relying on user input. For example, the known Turn Angle Sum (TAS) mechanism can be applied to identify, and position, anchor points to provide for the deformation of the bounding polygon 460. The TAS representation enables the finding of the most similar location of a "polyline" in both the interior map bounding polygon 460 and the bounding polygon 601 of an exterior representation of the venue, from the general map. The "polyline" can be a set of linked pixels that are approximated by a set of line segment. If the similarity measure between the two exceeds a threshold, it can be considered to be a match, and it can be utilized as an "anchor" point for deformation. As before, such anchor points can force a deformation algorithm to match found anchors to their matching location while preserving the shape of the rest of the interior map.

In one embodiment, to achieve a deformation result that can change the shape of the interior map bounding polygon 460 while still maintaining the internal structure as much as possible, a discrete optimization method can be utilized. Initially, the original configuration of the interior map's edges can be analyzed and divided into two groups: bounding polygon line segments, or "contour segments", and internal line segments, or "internal segments". During such an analysis, the number of measures that capture some local geometric properties that are to be preserved during deformation can be recorded. Subsequently, for each line segment a set of closest line segments in its neighborhood can be found and the angles between that line segment and its neighbors can be measured. Additionally, whether that line segment intersects any of its neighbors can be recorded, as can the side of each end of its neighbor line segments relative to its dividing thereof Subsequently, a positional configuration of the internal segments that will adhere both to the deformation constraints and will resemble their original configuration can be searched for. This can be performed by using a frame encoding for each line segment vertex. Each line segment can be thought of as implicitly defining a two-dimensional coordinate system, or "local frame", when the line segment's vector serves as one axis and its orthogonal vector defines the other axis. The frames defined by the contour segments can be utilized to encode the vertices of the internal segments in that, for an internal vertex and a contour line segment, the local coordinates of the vertex in the two-dimensional local frame defined by the segment in the original configuration, before the deformation, can be computed, as can its new absolute positional location by using the same local coordinates in the new local frame defined by the deformed version of the segment. The direction of the frames can be scaled relative to the change of length between the pre-deformation and the post-deformation versions of the segment. Such encoding algorithms can enable the computation of the location of each internal line vertex, and thus the location of the internal line segments, provided that each vertex is encoded by a specific contour segment.

The described optimization process can iteratively search for this association between internal vertices and contour line segments. In each iteration, the optimization search for the association of the vertex that violates the measures that were recorded in the analysis step by searching for a new association to a new contour segment that reduces the cost or deviation from the original measures. Such iterations can continue until a stable solution is achieved and no further improvement can be achieved.

Thus, when deforming the bounding polygon 460 and the internal structures of the interior map from which such a bounding polygon was derived, the parallelism of lines that were illustrated as being parallel can be maintained, as can right angles and relative position and sizing. For example, as shown in the system 600 of FIG. 6, deformation of the bounding polygon 460, the movement of the line segment 620 to the location of the line segment 621, can further result in the extension of the line segment 640 with the line segment 641, and a similar extension of the line segment 630 with the line segment 631, thereby maintaining the right angles between the line segments 640 and 620, now 641 and 621, and between the line segment 630 and 620, now the line segment 631 and 621. Similarly, the relative sizing of internal structures of the interior map can be maintained by, for example, extending the line segment 650 to the location of the line segment 651, in response to the extension of the line segment 620 to the location of the line segment 621. In a similar manner, the line segment 660 can be extended to the location of the line segment 661. Subsequently, as before, to maintain right angles, the line segments 670, 680 and 690 can be extended with the line segments 671, 681 and 691, respectively.

In one embodiment, in an interactive system, a user can mark one or more internal line segments' locations as "known" such that their edges can be regarded as anchored in the same manner as the external line segments described above. Alternatively, once internal line segments are transformed, such as in the manner described in detail above, a further check can be made for any independent confirmation of the location of the transformed internal line segments. For example, as described above, external features, such a roof features or the like, can be evidence of the location of internal boundaries within the venue. Consequently, in such an alternative embodiment, a comparison can be made between the location of the transformed internal line segments and independent location identifiers, such as roof features, and, if there is a difference, the optimization described above can be adjusted and performed again to reduce any such difference in subsequent iterations.

Figure 7:
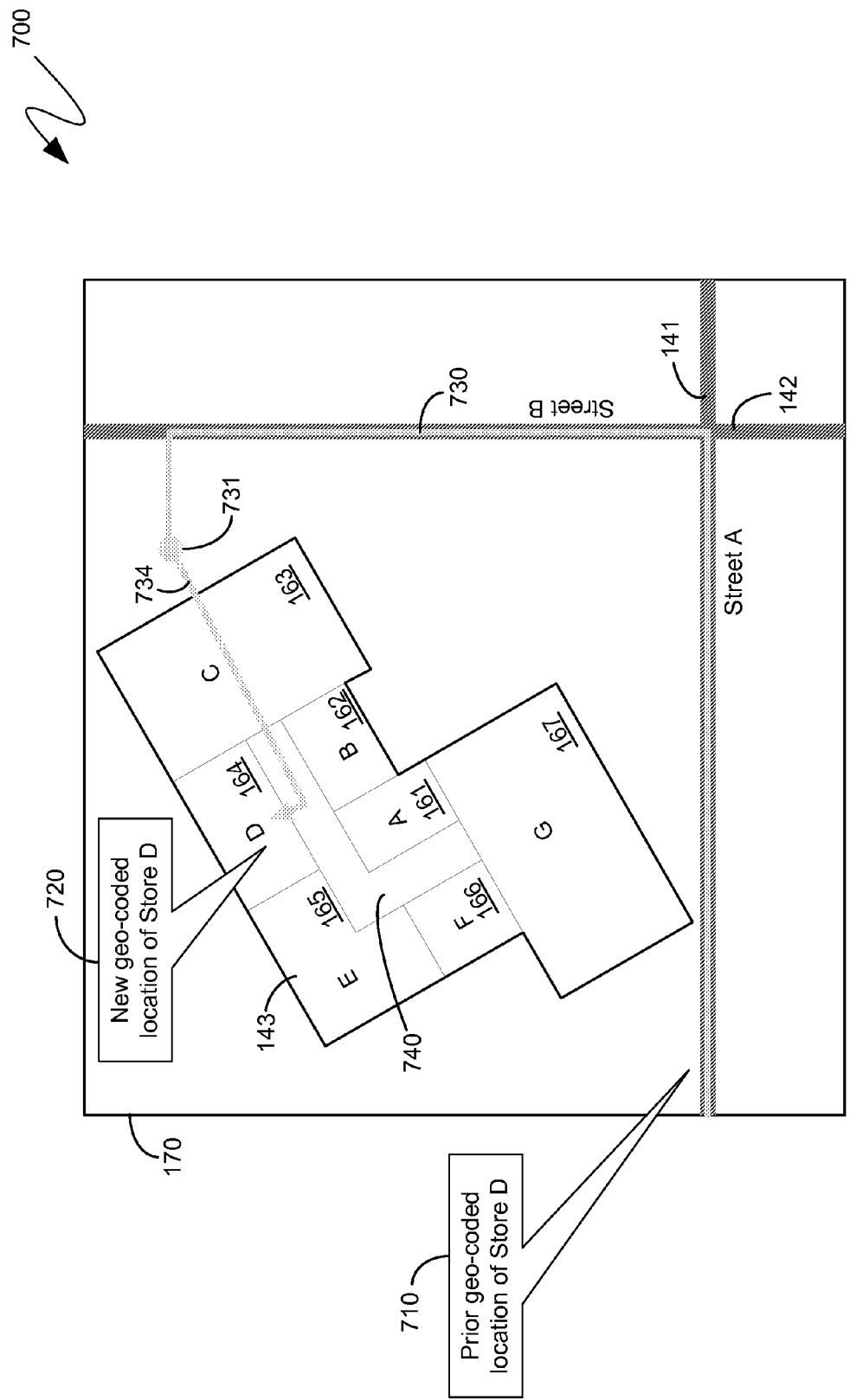
FIG. 7 is a block diagram of an exemplary updated geocoding utilizing amalgamated map data.

Once an interior map has been aligned with the exterior of a venue, as it is in a general map, the interior map can be combined with the general map to form an amalgamated map 170, such as that shown in the system 700 of FIG. 7. Turning to FIG. 7, one advantage of the amalgamated map 170 can be the more accurate positional information of establishments inside the venue 143. For example, the geocoded locations of the establishments inside the venue 143 can, previously, have been simply based on the address of the venue 143. Thus, in such an example, the geocoded location of the establishment 164 can previously have been at the location 710 shown in the system 700 of FIG. 7. As can be seen from the exemplary system 700, a user desiring to travel to the establishment 164, would be provided with directions that would position the user on the opposite side of the venue 143 from the actual location of the establishment 164.

Instead, in one embodiment, the amalgamated map 170 can be updated with more accurate geocoding. Thus, for example, the geocoded location of the establishment 164 can now be in the location 720, based on the interior map that was aligned with the location of the venue 143 in the general map and then combined therewith. Consequently, a user desiring to travel to the establishment 164 can now be provided with directions along the path 730 that can terminate at a location 731 that can be proximate to an entrance from which the establishment 164 can be conveniently accessed. In one embodiment, pathways within the venue, such as the pathway 740, can be encoded as such to provide for further, more detailed, directions. For example, a user could be instructed, after parking their car at the location 731 to proceed on foot via the path 734 to the establishment 164.

As will be recognized by those skilled in the art, the above-described deformations are most conveniently implemented if the interior map has been converted into a vertex-based map. Consequently, the geocoding described, and illustrated by the system 700 of FIG. 7, is, likewise, most conveniently implemented if the interior map has been converted into a vertex-based map. However, in another embodiment, the above-described rotation and at least some of the above-described deformation can be applied to a rasterized image. Such an image can then still be combined with the general map to form an amalgamated map 170, and information, such as the relative locations of the establishments 161, 162, 163, 164, 165, 166 and 167 can, at least, be visually presented to a user. Furthermore, the above-described geocoding can still be performed if the rotated and deformed rasterized image still comprises text that can be OCRed, such that at least approximate locations of the establishments 161, 162, 163, 164, 165, 166 and 167 in the venue 143 can be identified and utilized for geocoding purposes.

Figure 8:
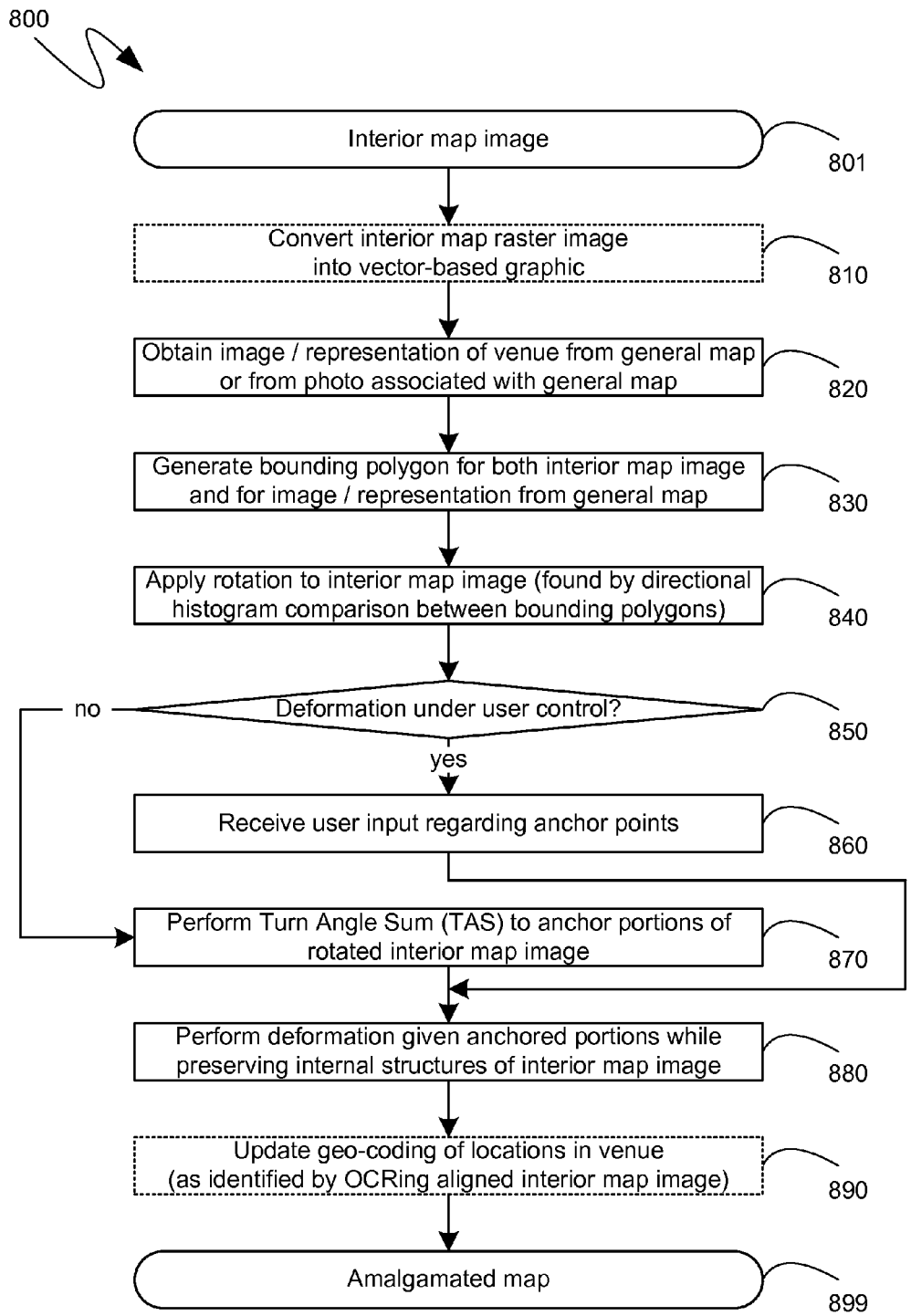
FIG. 8 is a flow diagram of an exemplary generation of amalgamated map data.

Turning to FIG. 8, the flow diagram 800 shown therein illustrates an exemplary series of steps that can be performed, such as by the map amalgamation component 130 that was shown in FIG. 1. Initially, at step 801, an interior map image can be obtained, such as in the manner described in detail above. Subsequently, at step 810, the raster image received at step 801 can be optionally converted into a vector-based graphic, as indicated by the dashed lines shown in FIG. 8. At step 820, a representation of the exterior of the venue, whose interior map was received at step 801, can be obtained either from the general map or from photographs associated with the general map, such as satellite imagery. At step 830, a bounding polygon, or other outline, can be generated from both the interior map image that was received at step 801, and the representation that was obtained at step 820. Subsequently, at step 840, the bounding polygon obtained from the interior map image can be rotated to align with the bounding polygon from the representation obtained from the general map.

Further deformations, that can more accurately align the interior map image with the representation of the venue in the general map, can be performed depending on whether such the information is under user control, as can be determined at step 850. If, at step 850, it is determined that the deformation is under user control, then processing can proceed to step 860, where user input regarding anchor points can be received, such as in the manner described in detail above. Alternatively, if, at step 850, it is determined that the deformation is not under user control, then processing can proceed to step 870, and the mechanisms such as the Turn Angle Sum mechanism described in detail above can be utilized to anchor portions of the interior map image to the bounding polygon associated with the representation of the venue from the general map.

Irrespective of whether user input was received at step 860, or automated processes were utilized at step 870, processing can proceed, at step 880, with a localized deformation, in accordance with the anchoring identified in either step 860 or 870. As indicated previously, the local deformation, at step 880, can maintain the parallelism of lines indicated in the interior map image as being parallel, and can likewise maintain the relative sizing of elements in the interior map image, right angles and the like. Subsequently, at step 890, the geocoding of locations, or establishments, in the venue, can be optionally updated based on the interior map image as aligned with the representation of the venue from the general map. As indicated previously, such geocoding can be performed, preferably with a vector-based image, but also with a rasterized image that can comprise OCR-able text, or that can be manually deciphered, and the geocoding performed, by a human user. The relevant processing can then end at step 899 with the amalgamated map comprising the interior map image as overlaid and integrated with the representation of the establishment in the general map.

Figure 9:
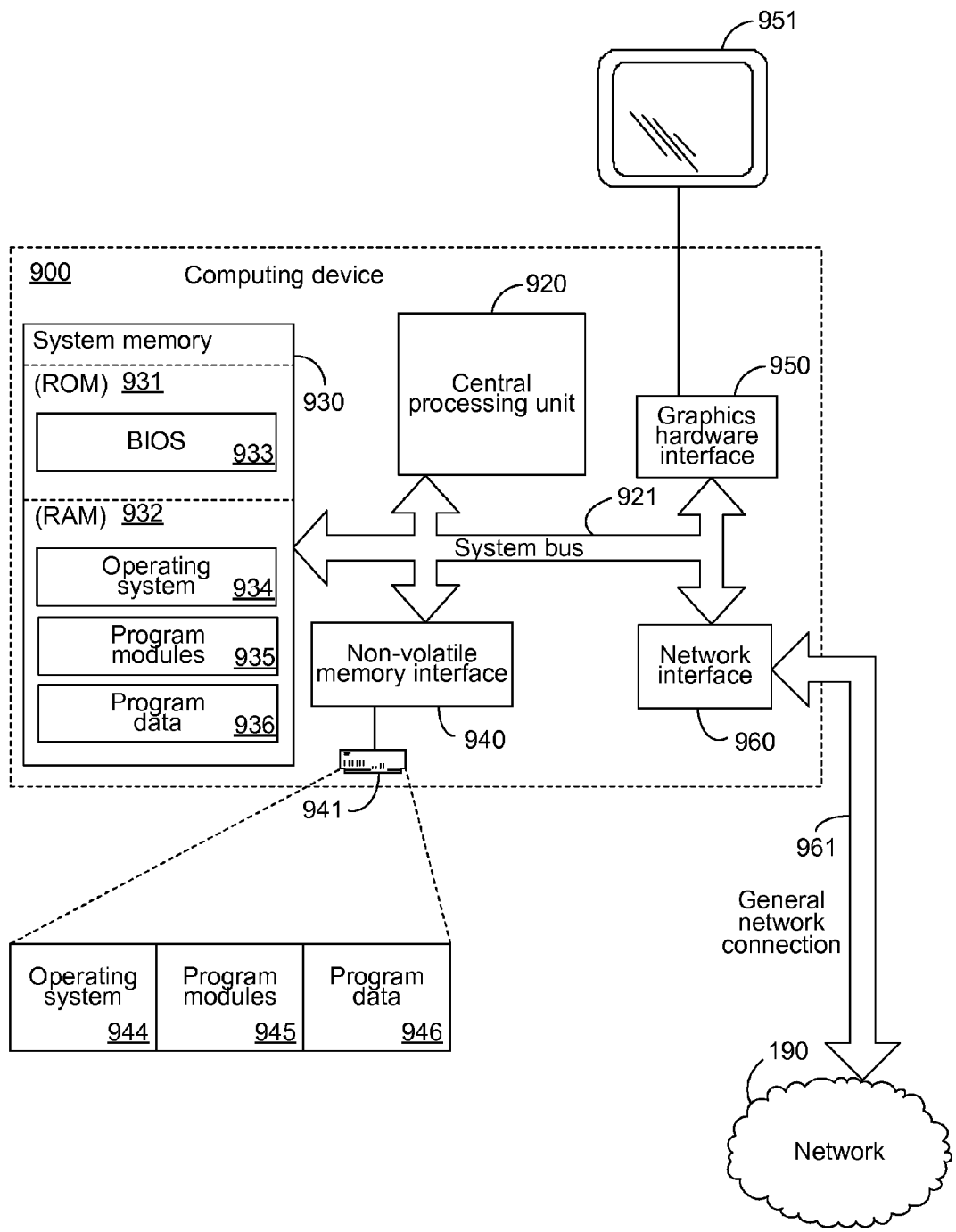
FIG. 9 is a block diagram of an exemplary computing device.

Turning to FIG. 9, an exemplary computing device 900 is illustrated upon which, and in conjunction with which, the above-described mechanisms can be implemented. The exemplary computing device 900 of FIG. 9 can include, but is not limited to, one or more central processing units (CPUs) 920, a system memory 930, that can include RAM 932, and a system bus 921 that couples various system components including the system memory to the processing unit 920. The system bus 921 may be any of several types of bus structures including a memory bus or memory controller, a peripheral bus, and a local bus using any of a variety of bus architectures. The computing device 900 can, optionally, include graphics hardware, such as for the display of a user interface to provide for user input, such as that described in detail above. The graphics hardware of the computing device 900 can include, but is not limited to, a graphics hardware interface 950 and a display device 951. The graphics hardware can be communicationally coupled to the system bus 921.

The computing device 900 also typically includes computer readable media, which can include any available media that can be accessed by computing device 900 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 900. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and the aforementioned RAM 932. A basic input/output system 933 (BIOS), containing the basic routines that help to transfer information between elements within computing device 900, such as during start-up, is typically stored in ROM 931. RAM 932 typically contains data and/or program modules that are immediately accessible to and/or presently being operated on by processing unit 920. By way of example, and not limitation, FIG. 9 illustrates the operating system 934 along with other program modules 935, and program data 936.

The computing device 900 may also include other removable/non-removable, volatile/nonvolatile computer storage media. By way of example only, FIG. 9 illustrates the hard disk drive 941 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940.

The drives and their associated computer storage media discussed above and illustrated in FIG. 9, provide storage of computer readable instructions, data structures, program modules and other data for the computing device 900. In FIG. 9, for example, hard disk drive 941 is illustrated as storing operating system 944, other program modules 945, and program data 946. Note that these components can either be the same as or different from operating system 934, other program modules 935 and program data 936. Operating system 944, other program modules 945 and program data 946 are given different numbers hereto illustrate that, at a minimum, they are different copies.

The computing device 900 can operate in a networked environment using logical connections to one or more remote computers. The computing device 900 is illustrated as being connected to the general network connection 961 through a network interface or adapter 960 that is, in turn, connected to the system bus 921. In a networked environment, program modules depicted relative to the computing device 900, or portions or peripherals thereof, may be stored in the memory of one or more other computing devices that are communicatively coupled to the computing device 900 through the general network connection 991. It will be appreciated that the network connections shown are exemplary and other means of establishing a communications link between computing devices may be used.

As can be seen from the above descriptions, mechanisms for automatically integrating existing interior maps with representations of corresponding venues in a general map, so as to form an amalgamated map have been enumerated. In view of the many possible variations of the subject matter described herein, we claim as our invention all such embodiments as may come within the scope of the following claims and equivalents thereto.

We claim:

1. One or more computer-readable storage media comprising computer-executable instructions for generating an amalgamated map from a general map and at least one interior map of at least one venue that is represented in the general map, the computer-executable instructions directed to steps comprising:
   generating, from a graphical image representing the at least one interior map, a first bounding polygon for the at least one interior map;
   generating, from a graphical image representing the general map, a second bounding polygon for a representation, in the general map, of the at least one venue corresponding to the at least one interior map;
   identifying, with the first and second bounding polygons, a transformation of the at least one interior map to align the at least one interior map with the representation, in the general map, of the at least one venue, wherein the at least one interior map and the at least one venue in the general map are misaligned prior to the transformation;
   applying the identified transformation to the at least one interior map; and
   generating the amalgamated map by incorporating the transformed at least one interior map with the representation of the at least one venue in the general map.

2. The computer-readable storage media of claim 1, wherein the computer-executable instructions for identifying the transformation comprise computer-executable instructions for identifying a rotation to be applied to the at least one interior map to align the at least one interior map with the representation, in the general map, of the at least one venue.

3. The computer-readable storage media of claim 2, wherein the computer-executable instructions for identifying the rotation comprise computer-executable instructions for generating a first directional histogram of the first bounding polygon; generating a second directional histogram of the second bounding polygon; rotating the first bounding polygon until the first directional histogram optimally aligns with the second directional histogram; and identifying the rotation of the first bounding polygon as the transformation of the at least one interior map.

4. The computer-readable storage media of claim 1, wherein the computer-executable instructions for applying the identified transformation comprise computer-executable instructions for applying a local deformation to the at least one interior map, the local deformation changing the at least one interior map while preserving an internal structure of the at least one interior map.

5. The computer-readable storage media of claim 4, wherein the computer-executable instructions for identifying the transformation comprise computer-executable instructions for receiving user input aligning portions of the first bounding polygon with portions of the second bounding polygon, the user-aligned portions of the first bounding polygon serving as anchor points for the local deformation.

6. The computer-readable storage media of claim 4, wherein the computer-executable instructions for identifying the transformation comprise computer-executable instructions for: utilizing a Turn Angle Sum mechanism to identify matching segments between the first and second bounding polygons; and aligning matching segments of the first bounding polygon with matching segments of the second bounding polygon, the aligned matching segments of the first bounding polygon serving as anchor points for the local deformation.

7. The computer-readable storage media of claim 4, wherein the preserving the interior structure of the at least one interior map during the local deformation comprises: preserving parallelism of lines shown as parallel in the at least one interior map; preserving right angles shown in the at least one interior map; and preserving relative sizing of establishments in the at least one interior map.

8. The computer-readable storage media of claim 1, comprising further computer-executable instructions for converting the at least one interior map from a raster image to a vector-based image.

9. The computer-readable storage media of claim 1, wherein the computer-executable instructions for generating the first bounding polygon comprise computer-executable instructions for excluding text, thereby enabling a determination of the first bounding polygon to proceed inward, towards a center of the interior map, through the text.

10. The computer-readable storage media of claim 1, wherein the computer-executable instructions for generating the first bounding polygon comprise computer-executable instructions for excluding disconnected structures, thereby enabling a determination of the first bounding polygon to proceed inward, towards a center of the interior map, through the disconnected structures.

11. The computer-readable storage media of claim 1, comprising further computer-executable instructions for: searching for images associated with an identification of the at least one venue and at least one map-centric keyword; receiving images in response to the searching; filtering the received images to remove low resolution images; filtering the received images to remove images with a wide color spectrum; and selecting, from among the images remaining after the filtering, the at least one interior map.

12. The computer-readable storage media of claim 1, comprising further computer-executable instructions for: obtaining, from the incorporated and transformed internal map, identifiers of at least some establishments of the at least one venue whose locations are depicted in the internal map; and geocoding a more accurate location of the at least some of the establishments as the locations depicted in the incorporated and transformed internal map as it is incorporated in the amalgamated map.

13. A method for generating an amalgamated map from a general map and at least one interior map of at least one venue that is represented in the general map, the method comprising the steps of:
   generating, from a graphical image representing the at least one interior map, a first bounding polygon for the at least one interior map;
   generating, from a graphical image representing the general map, a second bounding polygon for a representation, in the general map, of the at least one venue corresponding to the at least one interior map;
   identifying, with the first and second bounding polygons, a transformation of the at least one interior map to align the at least one interior map with the representation, in the general map, of the at least one venue, wherein the at least one interior map and the at least one venue in the general map are misaligned prior to the transformation;
   applying the identified transformation to the at least one interior map; and generating the amalgamated map by incorporating the transformed at least one interior map with the representation of the at least one venue in the general map.

14. The method of claim 13, wherein the identifying the transformation comprises identifying a rotation to be applied to the at least one interior map to align the at least one interior map with the representation, in the general map, of the at least one venue.

15. The method of claim 14, wherein the identifying the rotation comprises: generating a first directional histogram of the first bounding polygon; generating a second directional histogram of the second bounding polygon; rotating the first bounding polygon until the first directional histogram optimally aligns with the second directional histogram; and identifying the rotation of the first bounding polygon as the transformation of the at least one interior map.

16. The method of claim 13, wherein the applying the identified transformation comprises applying a local deformation to the at least one interior map, the local deformation changing the at least one interior map while preserving an internal structure of the at least one interior map.

17. The method of claim 16, wherein the preserving the interior structure of the at least one interior map during the local deformation comprises: preserving parallelism of lines shown as parallel in the at least one interior map; preserving right angles shown in the at least one interior map; and preserving relative sizing of establishments in the at least one interior map.

18. The method of claim 13, wherein the generating the first bounding polygon comprises excluding text, thereby enabling a determination of the first bounding polygon to proceed inward, towards a center of the interior map, through the text.

19. The method of claim 13, wherein the generating the first bounding polygon comprises excluding disconnected structures, thereby enabling a determination of the first bounding polygon to proceed inward, towards a center of the interior map, through the disconnected structures.

20. An amalgamated map stored on one or more computer-readable storage media and generated by a method comprising the steps of:
generating, from a graphical image representing the at least one interior map, a first bounding polygon for the at least one interior map;
generating, from a graphical image representing the general map, a second bounding polygon for a representation, in the general map, of the at least one venue corresponding to the at least one interior map;
identifying, with the first and second bounding polygons, a transformation of the at least one interior map to align the at least one interior map with the representation, in the general map, of the at least one venue, wherein the at least one interior map and the at least one venue in the general map are misaligned prior to the transformation;
applying the identified transformation to the at least one interior map; and
generating the amalgamated map by incorporating the transformed at least one interior map with the representation of the at least one venue in the general map.

* * * * *